Figure 1:
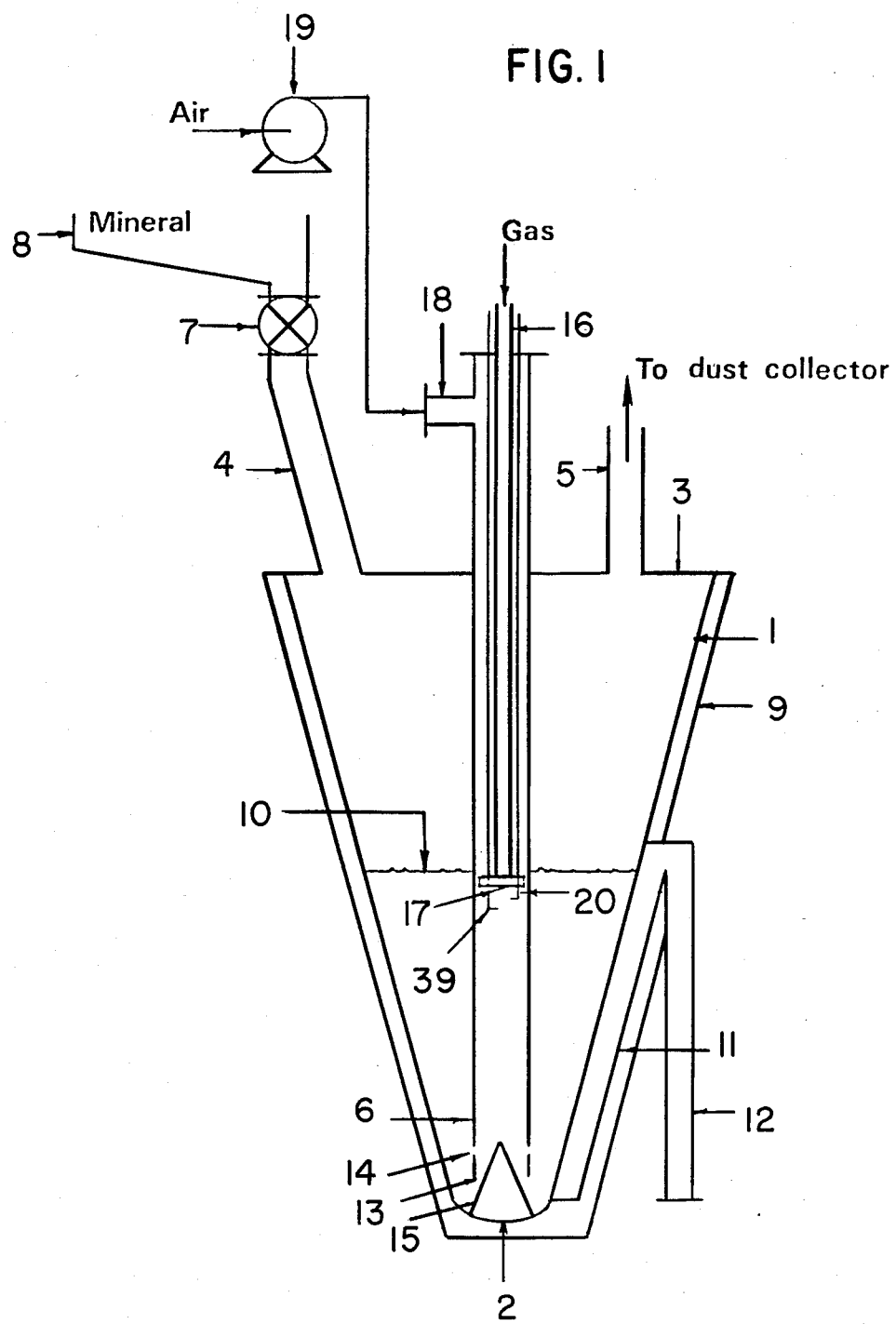

United States Patent [19]

Ward et al.

[11] Patent Number: 4,629,419
[45] Date of Patent: Dec. 16, 1986

[54] CALCINATION METHOD AND APPARATUS

[75] Inventors: Arthur G. T. Ward, Wilford; Christopher Todd-Davies, Nottingham, both of England

[73] Assignee: BPB Industries Public Limited Company, London

[21] Appl. No.: 232,347

[22] Filed: Feb. 6, 1981

Related U.S. Application Data

[63] Continuation of Ser. No. 95,814, Nov. 19, 1979, abandoned.

[30] Foreign Application Priority Data

Jan. 8, 1979 [GB] United Kingdom ............... 7900593

[51] Int. Cl.$^4$ ............................................. F27B 14/00
[52] U.S. Cl. .................................... 432/13; 432/58; 432/15; 432/171; 34/10
[58] Field of Search ................ 432/171, 13, 14, 15, 432/58; 106/109, 110; 34/10; 423/171, 172

[56] References Cited

U.S. PATENT DOCUMENTS

| | | | |
|---|---|---|---|
| 1,576,547 | 3/1926 | Reader | 432/58 |
| 2,647,738 | 8/1953 | Trainer | 432/58 |
| 3,542,347 | 11/1970 | Goldney et al. | 432/15 |
| 4,167,819 | 9/1979 | Ebeling et al. | 34/10 |
| 4,176,157 | 11/1979 | George et al. | 432/171 |

FOREIGN PATENT DOCUMENTS 1018464 1/1966 United Kingdom .
1488665 10/1977 United Kingdom .

Primary Examiner—Henry C. Yuen
Attorney, Agent, or Firm—Samuel Kurlandsky; Robert M. Didrick; Robert H. Robinson

[57] ABSTRACT

An apparatus for calcining a granular or powdered mineral, more specifically hydrated calcium sulphate, comprising a vessel the side wall or walls of which slope inwardly toward a bottom of small cross-sectional area, as compared with an upper region of the vessel, and provided with a downwardly extending heating tube connectable in an upper portion to a gas source and an opening in a lower portion into the interior of the vessel adjacent to the bottom thereof, the arrangement being such that, in use, hot gases issuing from the lower portion of the heating tube will mix and heat substantially all the contents of the vessel.

7 Claims, 2 Drawing Figures

CALCINATION METHOD AND APPARATUS

This is a continuation of application Ser. No. 095,814, filed Nov. 19, 1979, now abandoned.

This invention relates to a method and apparatus for calcining minerals, and more particularly gypsum (hydrated calcium sulphate).

One of the main methods by which gypsum calcination is carried out industrially is in a so-called "kettle". Calcination kettles have conventionally been operated on a batch basis, but more recently they have been operated by a continuous technique, as in British Pat. No. 1 018 464. However, the production rate in both batch and continuous kettle calcinations is at present limited by the permissible heat transfer through the kettle walls, and especially the bottom. This heat transfer is limited because there is a maximum allowed temperature of the metal, usually steel, of the kettle walls and bottom. Above this maximum there is a danger of frequent bottom burn-outs.

The invention described in British Pat. No. 1 488 665 aimed to increase the heat input to calcining kettles in both batch and continuous operations, thereby increasing the production capacity of the kettle, without the risk of adversely affecting the product quality or significantly increasing the kettle bottom temperature. According to that invention, calcium sulphate dihydrate is heated in a calcination vessel or kettle by heat applied indirectly through the external walls and bottom of the vessel and, additionally, by the direct introduction of hot gas into the the vessel through a tube extending downwardly from the top of the vessel and provided with at least one opening in its lower region which is immersed in the mass of the calcining material. While the application of the method disclosed in that patent has given greatly increased throughput and substantial increases in the thermal efficiency of kettle, the kettle itself is still subject to the maintenance problems usual with such vessels, and may occasionally require extensive repairs, for example to the refractory brickwork.

We have now developed a new form of calcination vessel in which all the necessary heat can be supplied directly into the material being calcined, thereby making it possible to dispense with much of the refractory brickwork associated with conventional kettles and to thermally lag the system, so increasing the thermal efficiency and reducing capital and maintenance costs.

According to the present invention there is provided an apparatus for calcining a granular or powdered mineral, more especially hydrated calcium sulphate, comprising a vessel the side wall or walls of which slope inwardly towards a bottom of small cross-sectional area, as compared with an upper region of the vessel, and provided with a downwardly extending heating tube connectable in an upper portion to a gas source and opening in a lower portion into the interior of the vessel adjacent to the bottom thereof, the arrangement being such that, in use, hot gases issuing from the lower portion of the heating tube will mix and heat substantially all the contents of the vessel.

The vessel may have any convenient shape, provided that its bottom has a sufficiently small cross-sectional area, in relation to the size and position of the hot gas tube, to ensure that the gas issuing from the tube agitates the granular or powdered mineral across the entire bottom of the vessel and so ultimately mixes with substantially the whole contents of the vessel.

Although asymmetrical vessels can be used, subject to the requirement for good mixings, it is preferred that the vessel be substantially symmetrical about a vertical axis, and the heating is preferably arranged to lie substantially along such vertical axis. A particularly preferred form of vessel at present is an inverted conical or frusto-conical vessel.

The bottom of the vessel may be specially shaped to assist in distributing the flow of hot gases or may be provided with one or more inserts to serve this purpose. For example, a conical insert may be seated on the vessel bottom, having its apex directed upwardly toward the lower opening in the heating tube.

Preferably the heating tube has its lower end open and also has in its lower part a plurality of gas distribution holes in the side wall, themselves preferably symmetrically disposed.

The heating tube may be connected to source of hot gas at an appropriate temperature, which may be derived from the combustion of a fuel, for example, gas, fuel oil or coal, or may be hot exhaust gas from another process, provided it does not interfere with the calcination reaction or product.

Alternatively, and in many cases more preferably the heating tube may be connected in its upper portion to a supply of fuel, which may itself be gaseous, and also to a source of oxygen and/or air, in which case the tube will include a fuel burner to produce hot gaseous combustion products. The burner may be associated with a combustion-initiating device, which may for example be electrical. By way of example, the fuel may be town gas or natural gas, and the combustion-initiating device may include a spark device. Preferably the fuel burner is positioned in the lower half of the tube so that in use the combustion of the fuel occurs at, or below, the level of the mineral in the vessel.

The vessel is preferably lagged externally against heat losses, in order to enhance the thermal efficiency of the system.

Desirably, the vessel is connected in its upper region to a dust collector. It is found that the dust which is collected in use, particularly in the case of gypsum, is predominately composed of calcined material and is itself a useful product.

If the vessel is to operate on a continuous basis, it is preferably provided with a valved inlet for the mineral, such as calcium sulphate dihydrate, and a valved outlet or overflow system for calcined material. Any suitable technique may be used for controlled feeding of the mineral into the vessel or for discharging the calcined material out of the vessel An overflow system for calcined material may comprise a rising discharge conduit leading from a lower region of the vessel to a weir over which discharged material flows. A rising conduit may function effectively because of the fluidization of the mineral in the vessel during use. This fluidization may be brought about directly by the action of gases from the heating tube but also by gases or vapours given off by the mineral as it calcines. For example, gypsum loses water to give heimhydrate or anyhydrous calcium sulphate, and the water vapour evolved causes "boiling" of the mineral.

For cleaning and maintenance purposes, the vessel may also be provided with inspection or access hatches and valved drainage outlets.

In another aspect, the present invention provides a method of calcining a granular or powdered mineral, especially hydrated calcium sulphate, which comprises continuously introducing the mineral into a vessel having a bottom of small cross sectional area as compared with an upper region of the vessel, continuously introducing hot gas through the vessel into direct contact with the mineral in the region of the bottom of the vessel, whereby the mineral in the bottom region is agitated and heated and the heating and agitation extends from the bottom region through substantially all the mineral in the vessel, and continuously withdrawing calcined mineral from the vessel, preferably by means of a weir or ovreflow device.

Most conveniently, the method is carried out in the apparatus according to the invention already described, and the efficiency of the method is dependent upon the various factors outlined above.

The temperature of the gases within the heating tube and issuing therefrom can be controlled in a number of ways, for example by the quantity of excess air used in combustion. Alternatively, an auxiliary air inlet may be provided in the tube between the burner and the lower region of the tube whereby additional air can be introduced to control the temperature of the mixture of air and combustion products in the tube.

The production of hemihydrate plasters and anydrous plasters and/or mixtures, including projection plaster that is, machine applied plasters which are commonly mixtures of hemihydrate and anhydrous plasters together with suitable additives can be carried out by this method mainly by controlling the effective calcination temperature. For example, if the temperature of the mass of the calcium sulphate being treated is maintained at about 140° to 170° C., the principal calcined product from calcium sulphate dihydrate is the hemihydrate, whereas at a much higher temperature, notably around 400° C. or above, the principal product is anhydrous calcium sulphate.

The invention is especially suited to the calcination of natural or chemical gypsum of whatever source, e.g. by-product gypsum from the manufacture of phosphoric acid or from the neutralization of the flue-stack gases or from the hydration of natural anhydrite.

Figure 2:
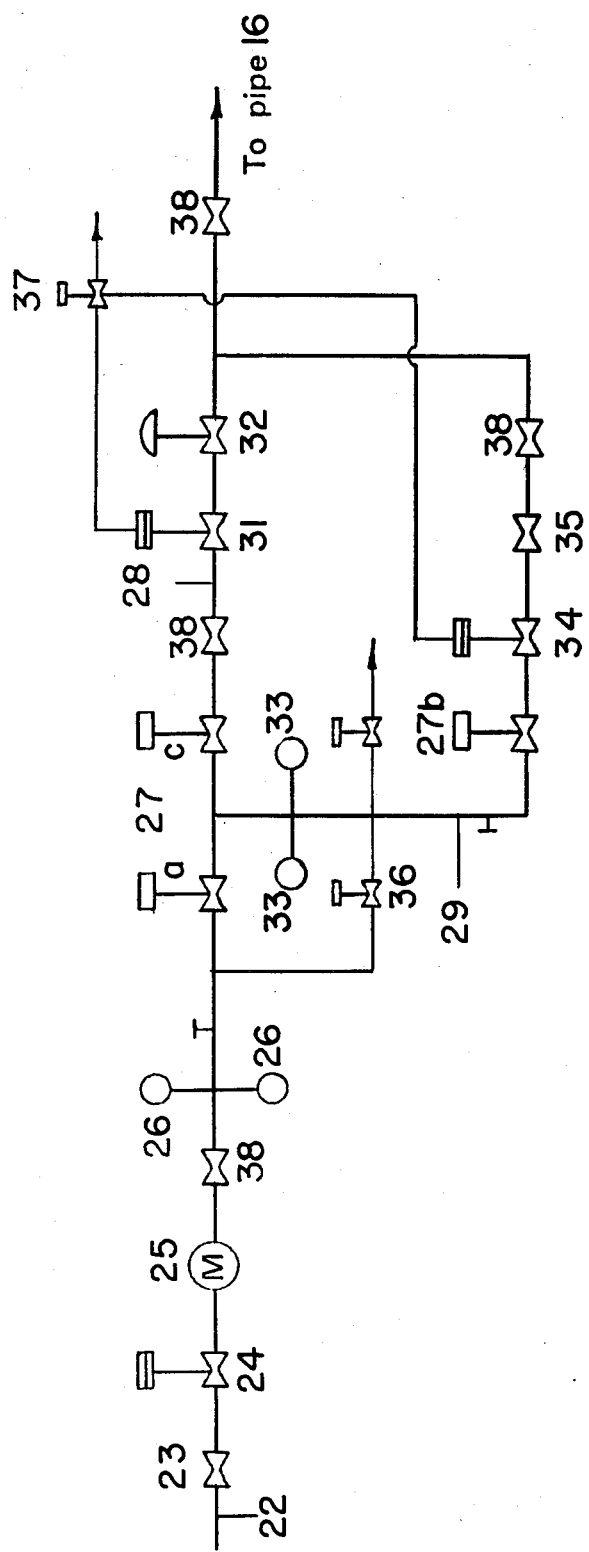

The invention will now be described, by way of example, with reference to the accompanying drawings in which FIG. 1 is a schematic diagram of a conical calcining vessel, according to the invention; and FIG. 2 is a schematic diagram of one example of a control system for operating the heating tube of the conical vessel of FIG. 1.

Referring firstly to FIG. 1, a vessel 1 of inverted conical form has a rounded bottom 2 and a lid 3 fitted with a feed pipe 4 for the material to be calcined, such as powdered gypsum, and an exhaust gas outlet pipe 5 connected to a dust collector (not shown). A heating tube 6 which is described in more detail below, also passes through the lid 3 into the interior of the vessel. The gypsum feed pipe 4 is provided with a metering valve in the form of a rotary feeder 7, which is connected to a gypsum bunker 8. The vessel is suitably lagged as indicated at 9.

The normal level of powdered material in the vessel when it is operating is indicated at 10. An outlet for calcined material is provided in the form of an external overflow weir 11 connected to a lead-off pipe 12.

The heating tube 6 extends downwardly substantially along the central vertical axis of the conical vessel 1. It is open at its lower end 13 and terminates adjacent to the bottom 2, of the vessel. The tube is also provided in the lower part of its wall with symmetrically disposed holes 14 for further facilitating the distribution of hot gases into the material being calcined. The distribution of gases emerging from the tube 6 can be further enhanced by the provision of an upright cone 15 of suitably heat-resistant material, which is seated on the bottom 2 of the vessel directly beneath the tube opening 13.

Fuel gas, for example natural gas, is supplied through a pipe 16 to a gas burner 17 of a nozzle-mix type located within the tube 6 at approximately the level 10 of the material in the vessel. Air is supplied separately to this burner through an air pipe 18 from a fan 19. The fuel/air mixture leaving the nozzle mix burner 17 is ignited by a spark probe 20 and the hot, gaseous products of combustion pass downwardly through the tube 6 and leave through its open end 13 and the holes 14. An auxiliary air supply to the heating tube is not generally used with this system.

Referring now principally to FIG. 2, the fuel gas is supplied along a line 22 through a main isolating valve 23, a mains governor 24, which reduces the line pressure to a suitable figure (in this particular unit 3 psig), and then through a meter 25. The pressure is then monitored by two pressure switches 26, which are set to determine the maximum and minimum pressure for safe operation. The flow of gas to the burner is controlled from a safety aspect by three shut-off valves one of which (27a) follows the pressure switches 13, one (27b) is in a main line 28, and one (27c) is in a pilot line 29. The main line also includes a further governor 31 and a throughput control valve 32, and the pilot lines contains a pair of pressure switches 33, its own governor 34 and a limiting valve 35. A bleed valve 36 additionally connects the main supply line to the pilot line 29, and a vent valve 37 is connected to the governors 31 and 34. Manual valves 38 are provided, which are usually left open but can be shut to isolate portions of the system. Both the main line 28 and the pilot line 29 deliver fuel gas to the pipe 16 of the heating tube 6.

Before the light-up sequence starts the shut-off valves 27 are checked to confirm that they are closed and not leaking. When the light-up sequence is started, by turning on the burner switch, the vent valve 37 closes and a timer unit within the burner control panel (not shown) monitors the sequence using the two pressure switches 33 and 27 to ensure that the space between the three shut-off valves 27 does not become pressurized through leakage of gas of air, and after thirty seconds to ensure that when the space is pressurized by opening of bleed valve 36 that the pressure is held for a further thirty seconds.

If both these checks are satisfactory then a visual indication that the check is complete will appear and the control cycle moves to the next stage. If either check has proved unsatisfactory then a warning indicator will appear. After the check indicator appears there is a pause for five minutes, during which time the air will purge the burner and calciner system. When that time has elapsed, the burner programming unit within the control panel will start the ignition sequence. A spark ignites the pilot gas after opening of the first shut-off valve 27a and the pilot valve 27b and the presence of flames is detected by a flame detection probe 39 approximately three inches from the burner 17. If a flame is detected and is stable, then the programming unit will allow the second main shut-off valve 27c to open, bringing on the main flame. At this point the vent valve 37 closes, allowing the governor 31 to function. The flow rate of gas is controlled by the setting of the throughput valve 32.

Some advantages of the calcination equipment according to this invention are as follows:

(1) The capital costs of the system for a given throughput is lower than for a conventional kettle.

(2) The unit need not use a stirrer, and hence there can be an overall saving in electrical energy.

(3) The thermal efficiency is even higher than with the invention described in British Pat. No. 1 488 665.

(4) Because the equipment does not contain complicated refractory brickwork, the maintenance cost will be lower.

(5) The start-up time is approximately 10 minutes, which is much shorter than with a conventional kettle.

As to the product, the physical characteristics are similar to those of the calcined material produced according to the method in British Pat. No. 1 488 665. In general, when the temperature of the hot gases is adjusted so that the temperature in the interior of the calcium sulphate is about 140° to 170° C. the system converts practically all the gypsum to hemihydrate, with little soluble anhydrite and almost nil gypsum as measured by differential thermal analysis.

We claim:

1. An apparatus for calcining granular or powdered mineral, especially hydrated calcium sulphate, the portion of said apparatus in which the powdered mineral is placed and in which the actual calcining takes place comprising a vessel having a top, bottom and side wall or walls, said vessel at said top having a larger cross-sectional area than at said botom, said cross-sectional area continually decreasing from said top to said bottom, said side wall or walls sloping inwardly continually from said top to said bottom, said vessel being arranged so that said powdered mineral being calcined rests on said bottom and said side wall or walls, and a downwardly extending heating tube mounted in said vessel connectable at an upper portion to a gas source and opening at a lower portion into the interior of said vessel adjacent to the bottom thereof, whereby in use hot gas issuing from the lower portion of the heating tube mixes with and heats substantially all the contents of said vessel, said bottom being of small cross-sectional area compared to the cross-sectional area of the upper region of said vessel to insure that gas issuing from said tube agitates the granular calcium sulphate across the entire bottom of said vessel, said vessel being free of any grid or grate to insure free flow of the calcining mixture.

2. An apparatus as claimed in claim 1 wherein the vessel is substantially symmetrical about a vertical axis and of inverted conical form, and said heating tube is arranged to lie substantially along said vertical axis.

3. An apparatus as claimed in claim 1 wherein the heating tube is open at its lower end and is provided with a plurality of gas distribution holes in the lower part of its side wall.

4. An apparatus as claimed in claim 1, wherein the bottom of the vessel is shaped to assist in distributing the flow of hot gas.

5. An apparatus according to claim 4, wherein the bottom of said vessel is provided with a conical insert having a base at least equal in diameter to the opening of the heating tube, for assisting in distributing the flow of hot gas.

6. An apparatus as claimed in claim 2, wherein said vessel is in the form of an inverted cone.

7. A method of calcining a granular or powdered mineral, especially hydrated calcium sulphate, the actual calcining taking place in a vessel having a top, bottom and side wall or walls, said vessel having a larger cross-sectional area at said top than at said bottom and continually decreasing in cross-sectional area from said top to said bottom, said side wall or walls sloping inwardly from said top to said bottom, which comprises continuously introducing the mineral into said vessel, continuously introducing hot gas through the vessel into direct contact with the mineral in the region of the bottom of the vessel whereby the mineral in the bottom region is agitated and heated and the heating and agitation extend from the bottom region through substantially all the mineral in the vessel, and continuously withdrawing calcined mineral from the vessel preferably by means of a weir or overflow device.

* * * * *